July 5, 1938.   E. C. HORTON   2,122,797
WINDSHIELD CLEANER
Filed Aug. 30, 1935
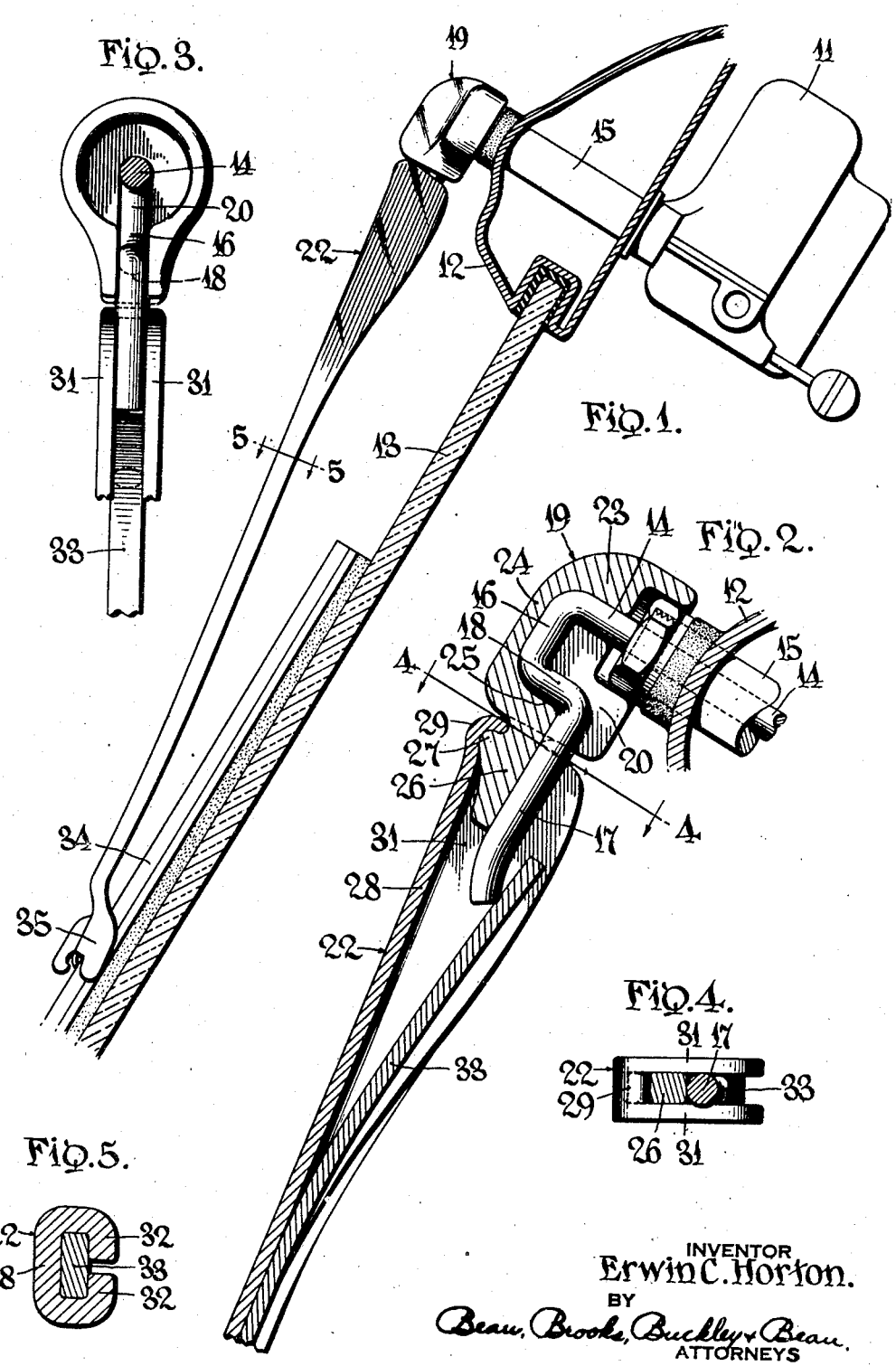
INVENTOR
Erwin C. Horton.
BY
Beau, Brooks, Buckley & Beau
ATTORNEYS Patented July 5, 1938

2,122,797

UNITED STATES PATENT OFFICE 2,122,797

WINDSHIELD CLEANER

Erwin C. Horton, Hamburg, N. Y., assignor to Trico Products Corporation, Buffalo, N. Y.

Application August 30, 1935, Serial No. 38,612

8 Claims. (Cl. 15—255)

REISSUED
OCT 8 - 1940

This invention relates to windshield cleaners and particularly to improved means for attaching the wiper blade carrying arm to the motor shaft or other actuating or supporting part.

According to the invention such shaft or part is provided with an extension with which a part of the wiper arm is engaged. The arm comprises two sections having an articulated connection including spring means, whereby the section connected to the blade is moved relative to the other section toward the windshield glass. The connection between the extension from the supporting shaft or part and the section of the arm that engages the extension is such that the spring means maintains it substantially rigid, whereby during normal operation the extension and connected arm section move as a unit, although they may be disconnected without the use of special tools or implements by manual movement of the parts against the pressure of the spring means. The latter, by reaction of the force urging one arm section toward the windshield glass, retains the articulated connection between the two arm sections, although permitting manual disconnection of the sections.

These and other objects and advantages will become apparent from the following description of the one typical embodiment of the invention shown in the accompanying drawing, wherein:

Fig. 1 is a side elevation of a windshield cleaner assembly embodying the invention and mounted upon the header and windshield construction of a vehicle;

Fig. 2 is a longitudinal sectional view of the connecting means and adjacent parts;

Fig. 3 is a rear view of said connecting means, the shaft appearing in section;

Fig. 4 is a sectional view taken along section line 4—4 of Fig. 2; and,

Fig. 5 is a section taken along section line 5—5 of Fig. 1.

As shown in Figs. 1 and 2 a windshield cleaner motor 11 is mounted upon the header construction 12 above the windshield glass 13, the motor having an angularly oscillatory shaft 14 extending forwardly through a tubular extension 15 of the motor housing. The forward end of shaft 14 is deformed to provide radially extending portions 16 and 17 connected by a portion 18 that substantially parallels the end of the shaft proper.

The end of the shaft 14 and the portions 16 and 18 constitute a loop which is snugly received within an elongated recess 20 formed on the rearward face of a casing section 19. The latter, the upper section of the wiper blade carrying arm of which the lower section or arm proper is designated by numeral 22, has an upper wall 23 adjacent the end of shaft 14, front wall 24 adjacent portion 16 of the shaft extension, lower wall 25 adjacent portion 18 of the shaft extension and lower front wall 26 which is formed to bear upon the forward surface of portion 17 of the shaft extension. The front surface of portion 26 has a semi-cylindrical projection 27 with axis of curvature extending transversely to and spaced radially from the axis of shaft 14.

Arm proper 22, preferably formed of sheet metal, has a front wall 28 of which the upper portion 29 is curved to conform to the curvature of projection 27 and is seated thereon. The upper side walls 31, 31 of arm 22 extend rearwardly from wall 28, and embrace the side surfaces of shaft extension portion 17 and lower wall 26 of the casing section as shown in Fig. 4.

Secured to arm 22, preferably by clenching thereover side wall portions 32 of the arm as shown in Fig. 5, is a resilient metal strip or leaf spring 33, the free end of which presses against portion 17 of the arm extension. The lower end of arm section 22 and the wiper blade 34 are provided with suitable detachable connection means 35 whereby the blade may be moved with the arm in wiping contact with the windshield glass.

In normal operation of the windshield cleaner the spring 33 coacting with arm section 22 clamps therebetween parts 26 and 17, thereby retaining arm extension parts 14, 16 and 18 seated in recess 20 of casing section 19 so that the latter is keyed for movement with the shaft 14. Further, and because the point at which spring 33 presses against shaft extension portion 17 is below the axis of cylindrical projection 27, the arm 22 is moved about the latter toward the windshield, i. e., in a counter clockwise direction as the parts appear in Fig. 2. Thus, the spring, in addition to maintaining the keyed relationship of the shaft 14 and arm section 19, and maintaining the articulated connection 27, 29 between the two arm sections 19, 22, also functions to retain the blade pressed into wiping engagement with the windshield glass.

The arm section 22 may, of course, be readily detached from casing section 19 by moving the portion 29 outwardly against resistance of the spring and thence downwardly, and thereafter section 19 can be detached from the shaft by simply moving it forwardly. It will be understood that the terms "upper", "lower", and the like are used herein and in the appended claims for convenience of description alone and not in any restrictive sense, since the windshield cleaner may be mounted in many different angular positions, as, for example, at the lower or side edges of windshield rather than at the upper edge as illustrated.

I claim:

1. In a windshield cleaner, a shaft having a depending projection with forward, upper and lower surfaces; a member detachable upon said depending projection of the shaft and having surfaces engaging said forward, upper and lower surfaces; a wiper arm having an articulated connection to said member whereby the arm may move about the point of connection toward the windshield, and spring means acting between said projection and arm for urging the latter about its pivot toward the windshield and to retain said member upon said projection.

2. In a windshield cleaner, a shaft having a radial extension, a casing member engaging the outer end of the shaft and said extension to preclude relative movement about the axis of the shaft proper between the casing member and shaft, an arm having an articulated connection to the casing member about an axis transverse to the axis of the shaft proper and spaced therefrom in the direction of extent of said radial extension, and a spring member carried by the arm and engaging a rearward surface of said extension for urging relative movement between the casing and arm about said axis to urge the arm toward the windshield surface, and to clamp the casing member to said extension.

3. In a windshield cleaner, a shaft having a radial extension adjacent the forward end thereof, a member detachably seated upon the extension and having surfaces bearing upon a forward, an upper and a lower surface of said extension, a wiper arm having an articulated connection to said member for movement relative thereto toward and away from the windshield surface, and a spring acting between the wiper arm and said extension to urge the wiper arm toward the windshield glass and to clamp the casing member to said extension.

4. In a windshield cleaner, a shaft having at the forward end thereof a projection constituting a pivot and a part extending radially beyond said pivot, an arm having a portion disposed forwardly of and bearing upon said pivot, and a resilient strip having one end secured to the arm and its other end bearing upon a rear face of said part.

5. In a windshield cleaner, a shaft having at the forward end thereof a projection constituting a pivot and a part extending radially beyond said pivot, an arm having a portion disposed forwardly of and bearing upon said pivot, and a resilient strip having one end secured to the arm and its other end bearing upon a rear face of said part, the resilient member urging movement of the arm relative to the shaft about said pivot toward the windshield and retaining said portion of the arm bearing pivotally upon said pivot.

6. In a windshield cleaner, a shaft having at the forward end thereof a depending part, a wiper arm having one end bearing upon the forward surface of the depending part at a point above the end thereof, said arm and depending part at said point being formed to constitute an articulated connection when the arm is pressed against said depending part, a leaf spring secured at one end to said arm and having its other end resiliently pressing against the rearward side of said dependency at the end thereof, whereby said articulated connection is maintained and the arm is urged about said connection toward the windshield glass.

7. In a windshield cleaner, a wiper arm of channel cross-section having bearing means at the upper end thereof for pivotally bearing upon a supporting part, and a leaf spring secured to the arm for bearing against such supporting part for urging the arm about the axis of the bearing toward the windshield, the secured end of the spring being received within the channel of the arm and the side walls of the channel being clenched thereover.

8. In a windshield cleaner, a shaft having a radially extending part, a casing member detachable from the shaft and engaging the outer end thereof, an arm having an articulated connection to the casing member for movement relative thereto about an axis transverse to the axis of the shaft, and spring means effective between said arm and said part for urging relative movement between the casing member and arm about the axis of said articulated connection tending to move the arm toward the windshield and to hold the casing member engaged with the arm.

ERWIN C. HORTON.